Patented Feb. 10, 1925.

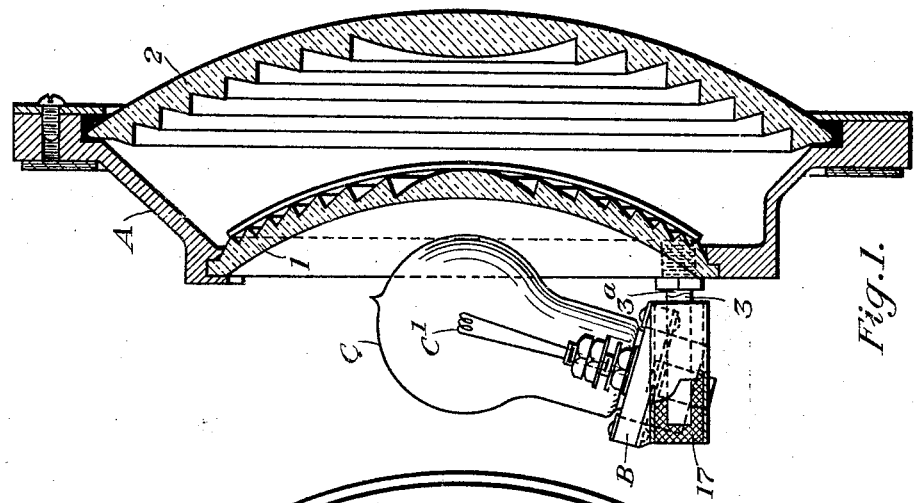
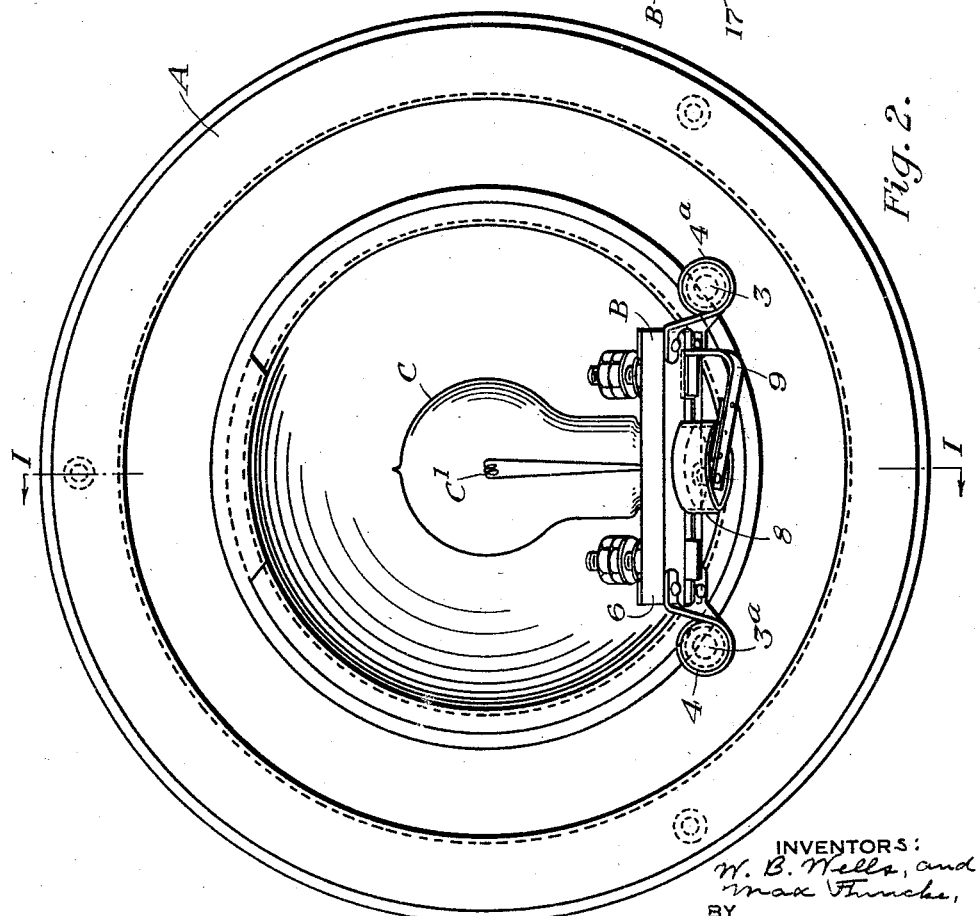

1,525,841

UNITED STATES PATENT OFFICE.

WESLEY B. WELLS, OF WILKINSBURG, AND MAX FUNCKE, OF PITTSBURGH, PENNSYLVANIA, ASSIGNORS TO THE UNION SWITCH & SIGNAL COMPANY, OF SWISSVALE, PENNSYLVANIA, A CORPORATION OF PENNSYLVANIA.

LIGHT SIGNAL.

Continuation of application Serial No. 671,342, filed October 29, 1923. This application filed August 18, 1924. Serial No. 732,667.

*To all whom it may concern:*

Be it known that we, WESLEY B. WELLS and MAX FUNCKE, citizens of the United States, residing at Wilkinsburg and Pittsburgh, respectively, in the county of Allegheny and State of Pennsylvania, have invented certain new and useful Improvements in Light Signals, of which the following is a specification.

Our invention relates to light signals, that is, signals comprising a light source and an optical device for projecting a beam of light from the source. Signals embodying our invention are particularly adapted for, though in no way limited to, use in railway signaling systems.

One feature of our invention is the provison of a simple and novel means for adjustably securing the light source in proper position with respect to the optical device.

The present application is a continuation of our co-pending application Serial No. 671342, filed on the 29th day of October, 1923, for light signals.

We will describe one form of light signal embodying our invention, and will then point out the novel features thereof in claims.

Figure 3:
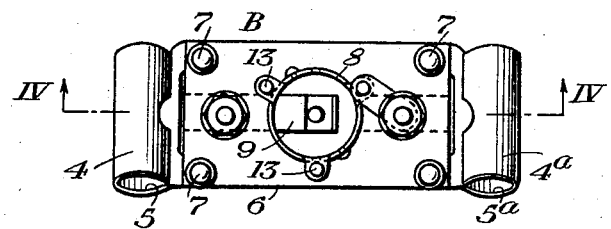
Figure 4:
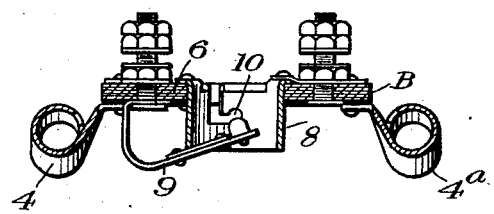

In the accompanying drawings, Fig. 1 is a view showing partly in vertical section and partly in side elevation, one form of light signal embodying our invention. Fig. 2 is a view showing in rear elevation, the light signal illustrated in Fig. 1. Fig. 3 is a top plan view of the lamp socket of the signal shown in Figs. 1 and 2. Fig. 4 is a sectional view along the line IV—IV of Fig. 3.

Similar reference characters refer to similar parts in each of the several views.

Referring first to Figs. 1 and 2, the signal comprises a suitable box or frame A in which is mounted an optical device. This device may be of any convenient form and as here shown is a lens combination comprising a front lens 2 and a back lens 1. These lenses are arranged to project a beam of substantially parallel rays from a light source located at the focal point of the lens combination. The source of light here shown comprises an electric lamp C having a filament C'.

To utilize most efficiently the light originating from C', this filament should be placed precisely at the focal point of the lens combination. The life of any individual lamp C is however comparatively short. To insure uniformity with different lamps in the same signal we propose to accurately "base" each lamp, that is, to locate the filaments of all lamps uniformly with respect to their bases. Having once adjusted the receptacle for receiving the lamp C in proper position it follows that any other individual lamp similarly based may be placed in the receptacle and its filament will be in the focal point of the lens combination.

In our invention the accurate positioning of the lamp receptacle with respect to the focal point of the lenses is accomplished as follows: The frame A which supports the lens combination is provided on its rear side with two spaced parallel outwardly projecting studs 3 and $3^a$. Supported by these studs as will appear hereinafter is a socket designated by the reference character B, and illustrated in detail in Figs. 3 and 4. This socket comprises a flat plate 6 of some suitable insulating material. A receptacle 8 is fastened to this plate by means of rivets 13. As here shown this receptacle is of the single contact bayonet type, and is provided with a slot 10 to accommodate the usual lug on the side of the lamp base. Supported also by plate 6 is a spring contact 9 arranged to engage the bottom contact of the lamp inserted in receptacle 8. Mounted on opposite ends of plate 6 and fastened thereto by means of rivets 7 are two lugs 4 and $4^a$. Each of these lugs is of sheet material and is turned back on itself to form a tubular sleeve capable of receiving one of the studs 3 or $3^a$, with considerable clearance. The plane of the axes of the two holes 5 and $5^a$ in sleeves 4 and $4^a$ makes a small angle with the plane of plate 6.

In assembling the signal a lamp C properly based is inserted in receptacle 8, and studs 3 and $3^a$ are then inserted in sleeves 4 and $4^a$, respectively. Under these conditions considerable movement of lamp C in any direction with respect to the lens combination is possible. The socket B is adjusted to a position in which the filament C' is at the focal point of the lens combination. With the socket in this position the space between each stud 3 or 3ᵃ and the associated sleeve 4 or 4ᵃ is filled with sealing material having the characteristic of being plastic when applied but solid after standing. This sealing material should be a composition which will not shrink while becoming solid. It may be a material which is plastic while hot and solid when cold, such as sulphur, type metal, or antimony-lead alloy. Or it may be a material which is plastic when fresh but solid after drying, such as plaster of Paris or other cements. When this sealing material becomes solid the sleeves 4 and 4ᵃ will be held rigidly in place with respect to the studs 3 and 3ᵃ, and the socket B will therefore be held rigidly in place with respect to the lens combination. It is therefore plain that any lamp C, properly based, may be used interchangeably in the receptacle 8.

Although we have herein shown and described only one form of light signal embodying our invention, it is understood that various changes and modifications may be made therein within the scope of the appended claims without departing from the spirit and scope of our invention.

Having thus described our invention, what we claim is:

1. A light signal comprising a frame, an optical device mounted in said frame, an outstanding stud mounted on said frame, a socket provided with a tubular sleeve capable of receiving said stud with considerable clearance, sealing material filling the space between said stud and said sleeve and having the characteristic of being plastic when applied but solid after standing, and a lamp mounted on said socket for supplying light to said optical device.

2. A light signal comprising a frame, an optical device mounted in said frame, an outstanding stud mounted on said frame, a socket provided with a tubular sleeve capable of receiving said stud with considerable clearance, an antimony lead alloy filling the space between said sleeve and said stud for maintaining said socket in adjusted position with respect to said device, and a lamp mounted on said socket for supplying light to said optical device.

3. A light signal comprising an optical device, two spaced studs fixed with relation to said device, a socket having two spaced tubular sleeves each capable of receiving one of said studs with considerable clearance, an antimony lead alloy in each said sleeve around the associated stud for maintaining the socket in adjusted position with respect to said device, and a light source supported by said socket in fixed relation thereto.

In testimony whereof we affix our signatures.

WESLEY B. WELLS.
MAX FUNCKE.